United States Patent
Lane

(10) Patent No.: US 9,284,946 B2
(45) Date of Patent: Mar. 15, 2016

(54) VERTICAL AXIS WINDMILL WITH PASSIVE OVER-SPEED PROTECTION

(71) Applicant: Kenneth B. Lane, Haskell, TX (US)

(72) Inventor: Kenneth B. Lane, Haskell, TX (US)

(*) Notice: Subject to any disclaimer, the term of this patent is extended or adjusted under 35 U.S.C. 154(b) by 93 days.

(21) Appl. No.: 13/713,204

(22) Filed: Dec. 13, 2012

(65) Prior Publication Data

US 2014/0169933 A1 Jun. 19, 2014

(51) Int. Cl.
*F03D 3/06* (2006.01)

(52) U.S. Cl.
CPC ............... *F03D 3/067* (2013.01); *Y02E 10/721* (2013.01); *Y02E 10/74* (2013.01)

(58) Field of Classification Search
CPC ....... F03D 1/06; F03D 7/0224; F03D 7/0264; F03D 7/041; F03D 3/067; F03B 220/70; F03B 220/72; F03B 220/75; F03B 220/77
USPC ............ 415/4.2, 4.4, 130, 907; 416/142, 143, 416/122, 145, 153, 187, 205
See application file for complete search history.

(56) References Cited

U.S. PATENT DOCUMENTS

| | | | |
|---|---|---|---|
| 1,341,045 A * | 5/1920 | Currey | 416/135 |
| 4,004,861 A * | 1/1977 | Soules | 416/41 |
| 4,032,257 A * | 6/1977 | de Haas | 416/117 |
| 4,061,926 A | 12/1977 | Peed | |
| 4,334,823 A | 6/1982 | Sharp | |
| 4,468,169 A | 8/1984 | Williams | |
| 4,494,007 A | 1/1985 | Gaston | |
| 4,718,821 A * | 1/1988 | Clancy | F03D 7/06 416/119 |
| 4,718,822 A | 1/1988 | Riezinstein | |
| 5,332,925 A | 7/1994 | Thomas | |
| 5,570,859 A | 11/1996 | Quandt | |
| 6,069,409 A * | 5/2000 | Fowler et al. | 290/55 |
| 7,220,107 B2 * | 5/2007 | Kaneda | 416/186 A |
| 7,258,527 B2 * | 8/2007 | Shih | B63H 9/00 415/4.2 |
| 7,911,076 B2 | 3/2011 | Stephens et al. | |
| 8,038,384 B2 * | 10/2011 | Brown | F03D 3/067 415/4.2 |
| 8,585,364 B2 * | 11/2013 | Kosch | F03D 3/067 416/12 |
| 2009/0066090 A1 * | 3/2009 | Boone | 290/55 |
| 2011/0006526 A1 | 1/2011 | Hemmingsson | |
| 2011/0176919 A1 * | 7/2011 | Coffey | 416/124 |
| 2012/0045333 A1 | 2/2012 | Al-Azzawi | |

FOREIGN PATENT DOCUMENTS

FR 2472678 A1 * 7/1981 ............. F03D 3/007

* cited by examiner

*Primary Examiner* — Craig Kim
*Assistant Examiner* — Adam W Brown
(74) *Attorney, Agent, or Firm* — Merek, Blackmon & Voorhees, LLC

(57) ABSTRACT

A windmill is disclosed having over speed protection. In a preferred embodiment, the vanes are symmetric, curved metal sheets, with each vane's shape having a circular arc corresponding to its portion of the cylindrical support structure. Each vane is mounted with a large leading portion exposed to the wind. The imbalance of surface area causes the wind to push the vane open when moving downwind and push the vane closed when moving upwind. During periods of high rotational speed, the off-axis centers of mass cause each vane to rotate towards a closed position under centrifugal force. Once the critical speed is reached, the vanes fully close as they pass through the upwind side.

19 Claims, 4 Drawing Sheets

VERTICAL AXIS WINDMILL WITH PASSIVE OVER-SPEED PROTECTION

BACKGROUND OF THE INVENTION

1. Field of the Invention

The present application relates to a windmill having vanes that automatically withdraw from the wind to protect the windmill from over speed in high winds and redeploy when winds lessen.

2. Description of the Prior Art

Conventional agricultural water windmills are observed to be susceptible to damage during high wind conditions, particularly during the downburst gust events of thunderstorms. In the conventional design, a number of metal vanes are balanced about a horizontal axis. The damage from high wind conditions can occur in the form of thrown vanes. High rotational speed develops excessive stress in the connectors holding the vanes to the axis, and at a critical speed some of these connectors break. The remaining vanes are no longer balanced, causing high shaking forces on the windmill axis. These shaking forces can damage attached machinery, such as the pump and other down-hole components.

The design concept proposes to eliminate this damage sequence by incorporating a passive control system into the windmill. The passive control system limits the maximum rotational speed, preventing large centrifugal forces from causing vane detachment.

None of the prior art, taken either singly or in combination, is seen to describe the instant invention as claimed.

SUMMARY OF THE INVENTION

Over speed protection for windmills is disclosed. The basic aerodynamic and structural aspects of the proposed designs are shown in Figures. In a preferred embodiment, the vanes are symmetric, curved metal or composite sheets, with each vane's shape preferably being a circular arc corresponding to its portion of the cylindrical support structure. For instance, in the cylindrical embodiment, if eight vanes are installed on the windmill, each vane is approximately the shape of one-eighth circle with diameter equal to the diameter of the vane support structure. The bottom and top of each vane is attached to this support structure. The vane is connected by a hinged connection to the support structure, and the passive control system is capable of changing the orientation of the vanes relative to the support structure. If one draws an imaginary radial line from the power shaft to the vane hinge, then the fully open position is with the vane interior ("inward/inboard portion") of the hinge extending slightly past this line in the direction of intended rotation. Correspondingly, the portion of the vane exterior ("outward/outboard portion") to the hinge extends slightly behind this line. The vane is not mounted on the hinge symmetrically. More surface area is located outwardly from the hinge position. The imbalance of surface area causes the wind to push the vane open when moving downwind and push the vane towards "closed" when moving upwind. Mechanical stops prevent the vane from moving past its intended fully open or fully closed positions.

Weights may be attached to the vanes to move their center of mass inward of the hinge. The location of the center of mass affects the behavior of the passive control mechanism. Preferably the weight is located at the inside edge of each vane.

During periods of high rotational speed, the off-axis centers of mass cause each vane to rotate towards a closed position under centrifugal force. On the upwind side of the mill the vanes naturally partially close because of the action of the wind. Once the critical speed is reached, the vanes fully close as they pass through the upwind side. They then remain fully closed because of the inertial forces of the off-axis center of mass. Strong positive rotational acceleration (spool-up) may slightly delay the closing action to a higher speed. The closed position is shown in FIGS. 1A, 4 and 7. All of the vanes rotate to form a closed cylinder, preventing the wind from generating any torque and thereby limiting any further increase in speed.

The vanes' centers of mass response to the acceleration is the mechanism that causes the vanes to close. Once the vanes are closed, two possible mechanisms are proposed to restore the vanes to the open position once acceptably low speeds are reached. Both rely on gravitational force to provide a restoring torque.

In one concept, the axis of each vane is inclined slightly. At slow speeds the weight of the vanes causes them to return to the open position. A mechanical stop prevents the chord line from moving past the parallel orientation.

In a second concept, the axis of each vane is exactly vertical as shown in the Figures. However, the bottom connection of each vane is actually a cam. The cam has a sloped surface, which may either be a constant angle or a progressively increasing angle. At slow speeds the weight of the vane causes it to slide down the surface, which also causes it to rotate back to the open position.

Accordingly, it is a principal object of a preferred embodiment of the invention to provide a windmill having over speed protection.

It is another object of the invention to provide a windmill with retractable vanes that close when speeds exceed a certain rpm.

It is a further object of the invention to provide a windmill over speed protection system having an eccentric for returning the vanes to their normal, deployed position when the rotation drops below a certain amount.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

Figure 1A:
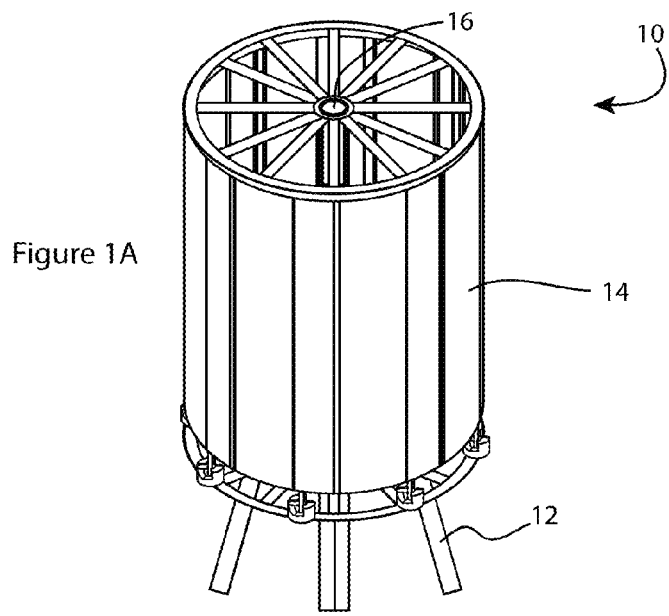
FIG. 1A is a perspective view of a windmill according to a preferred embodiment of the invention in a closed position.
Figure 2:
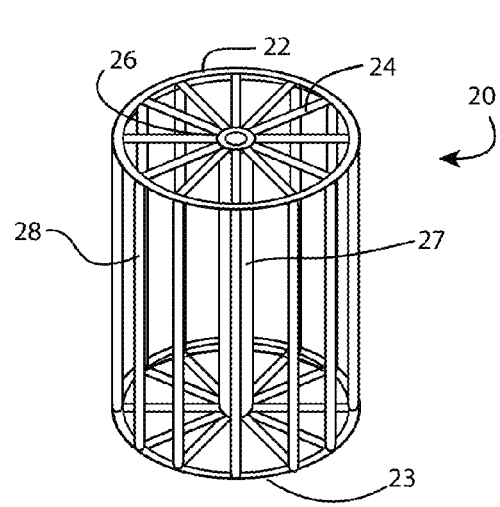
FIG. 2 is a perspective view of the support structure of the preferred embodiment of the invention.
Figure 3:
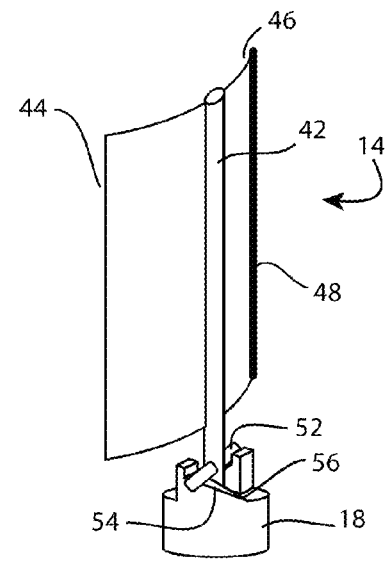
FIG. 3 is a perspective view of a vane of the preferred embodiment of the invention.
Figure 1B:
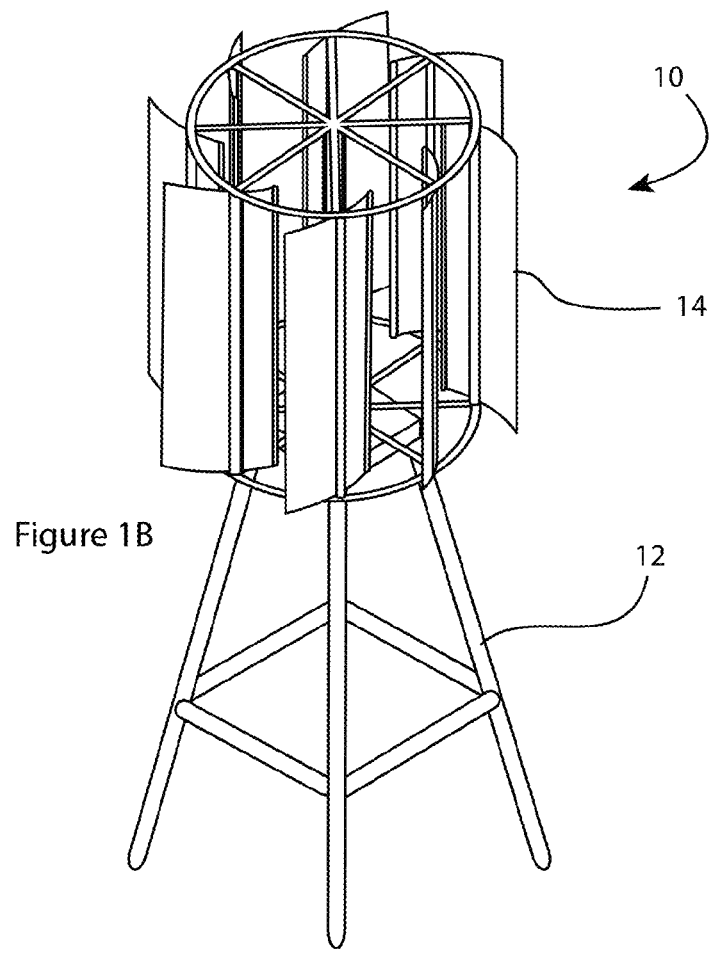
FIG. 1B is a perspective view of a windmill according to a preferred embodiment of the invention in an open position

The present invention is to an overspeed protection system for a windmill. A vertical windmill 10 is best shown in FIGS. 1-3. Vertical windmills are so called because they rotate about a vertical axis. The windmill includes a number of components including the support structure 20 (FIG. 2), a stand 12, vanes 14, and a center axis 16. The structure determines the basic rotational path of the vanes on the windmill. In this embodiment, the vanes will rotate to form a cylindrical curve. Other shapes may also be used such as the frustoconical shape of the windmill of FIG. 7.

The support structure 20 includes a wagon-wheel type circular top support 22 and a matching bottom support 23, each having a number of arms 24 and a center 26. The top and bottom support are connected by a number of vane supports 28. The vane support 28 forms the point of rotation for each vane. Preferably, the support structure components are made from steel, aluminum alloy, or composite material and are joined together and dynamically balanced so that it rotates about an axis formed by or received within the support center 26. In a preferred embodiment the support center 26 includes a sleeve 27 that is bolted or otherwise rigidly mounted to a shaft (not shown). The shaft is supported by bearings in the tower ("base") 12 that maintains the windmill at the desired height. The windmill and shaft assembly freely rotate except for the resistance provided by a pump or other equipment powered by the windmill.

Figure 7:
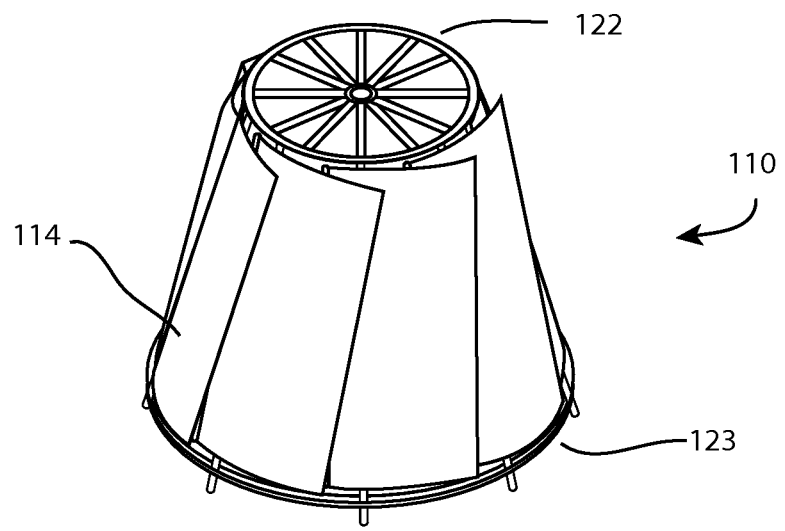
FIG. 7 is a perspective view of a windmill according to a second preferred embodiment of the invention.

When the support structure 20 rotates with the shaft about its axis, the vane supports 28 rotate in a regular, symmetric pattern about the axis guided by the arms 24 of the top and bottom supports (22,23) of the support structure. In FIG. 2, this pattern would be a cylindrical curve. In FIG. 7, this pattern would be a frustoconical curve. For the purposes of this application, the path of the vane supports about the shaft axis will be defined as the "windmill support base curve." Each support follows the path of the windmill support base curve as it travels around the shaft axis.

Vanes ("blades") 14 are mounted on each vane support 28. The vane preferably includes a sleeve 42 for mounting rotatingly over the vane support 28. The vane sleeve is preferably asymmetrically mounted about the vane so that the outward edge 44 is further from the sleeve 42 than the inward edge 46. The asymmetric mounting allows the vanes to partially or fully close on the upwind side of the windmill. The counter-productive forces the upwind vanes exert on the downwind vanes are thereby reduced, resulting in an increase in power over the symmetrically mounted vanes. The inward edge preferably has a weight 48 mounted on the vane to aid in withdrawing the vane during severe winds as will be discussed further under. The vane preferably has a curvature that has approximately the same radius as the windmill support base curve so that when the vanes are withdrawn and laying against the vane supports have a reduced profile to the wind. In a most preferred embodiment, the vanes are each made of one section of a cylinder that has the same radius as the vane support arms 22 so that the vanes together form a cylinder when in their withdrawn position to lie along the path defined by the windmill support base curve.

The vanes include a mechanism to return the vane to the normal deployed position when no forces are acting on it. One such mechanism is shown in FIGS. 1A and 3. An eccentric 18 is provided below the vane sleeve 42. The vane sleeve is installed over the vane support 28 as described above so that the vane can rotate about the vane support. The sleeve is preferably provided with a number of followers 52 to ride in the cam paths 54. Stops may be provided on the support structure 20 or on the eccentrics 18 so that the followers 52 cannot escape the cam paths 54. Preferably the stops are provided on the support structure 20 to prevent over rotation of the vanes 14.

The weight of the vanes 14 acts through the vane sleeve 42 onto the followers 52. This force causes the vane to rise up and down according to the cam paths 54 as the vane rotates about the vane support 28. The eccentric is mounted at the bottom of the vane support 28 in an orientation such that when the vanes are deployed, the followers 52 are at or near the bottom 56 of the eccentric and when the vanes are undeployed (lying closer to the vane support base curve) the followers are higher along the cam path 54. In this way gravitational forces will cause the vanes to be biased towards the deployed position as the followers will want to gravitate towards the bottom of the cam paths 54. If no forces are acting on the vane, and the vane is in the undeployed ("closed") position, gravity will cause the followers to travel down the cam paths to open the vanes to the deployed position.

Figure 6:
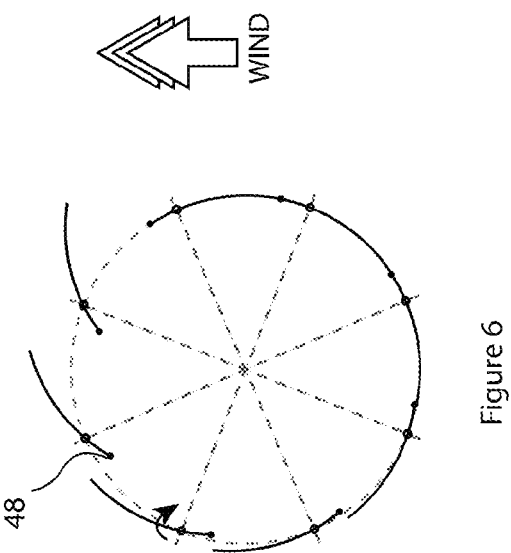
FIG. 6 is a diagrammatic view of the operation of the windmill transitioning to over speed operation.
Figure 4:
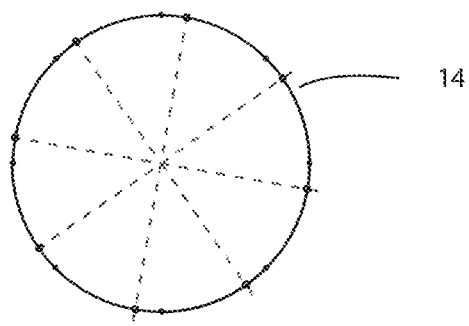
FIG. 4 is a diagrammatic view of the windmill in a retracted or closed position.
Figure 5:
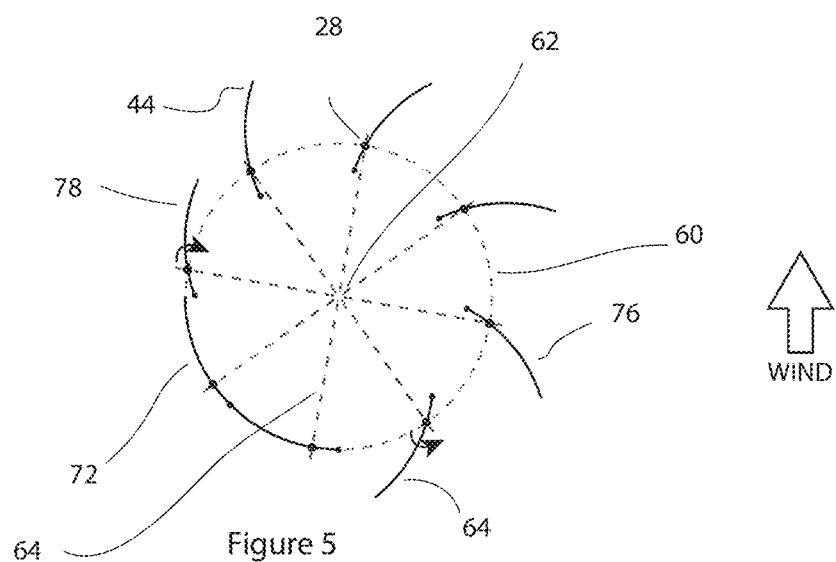
FIG. 5 is a diagrammatic view of the operation of the windmill in normal operation.

As best seen in FIGS. 4-6, the windmill vanes 14 during operation will move between open and closed positions under the forces of gravity, wind and centrifugal force. FIG. 4 shows the vanes 14 in an undeployed or closed position. The vanes all lie along the windmill support base curve 60 defined by the rotation of the vane supports 28 as they rotate about the shaft axis 62 at a radius 64 provided by the support arms 24.

FIG. 5 shows a top view of the vanes of a vertical windmill in their normal operation with the windmill rotating in the counterclockwise direction. The windmill could also be designed to rotate in the clockwise direction, but any one design operates in only one direction. All of the figures have arbitrarily used the counterclockwise design direction for their illustration. As the wind blows towards the top of the drawing sheet, vanes on the upwind swing (e.g., the left side of the drawing sheet) will rotate towards their closed position 72 as the wind acts on the outward edge 44 (FIG. 3) of the vane 14. As the vane rotates away from the wind (e.g., towards the top), the vanes will begin to deploy 74 as gravity acting on the followers 52 (FIG. 3) overcome the force of the wind on the vane. In this position, the inward edge 46 (FIG. 3) of the vane is preferably slightly ahead of a radial line extending from the axis to the vane's support 28 and the outward edge 44 is slightly behind the radial line. As the vane continues to rotate counterclockwise, gravity and the force of the wind acting on the vane will cause it to deploy 76 as the vane is brought into the wind fully opening as the wind catches the interior of the vane. The vane will then continue to rotate so that the vane is oriented against the wind 78 and begins to close again.

FIG. 6 shows the vane transitioning into the overspeed prevention mode. As the wind accelerates, the windmill will also accelerate. The wind may cause an unprotected windmill to self-destruct if the wind causes the windmill to rotate so fast that it becomes unbalanced, especially if damage to individual vanes causes an imbalance in the rotational forces on the windmill. The vanes themselves may also be damaged by prolonged exposure to high winds. By withdrawing the vanes to a retracted position and reducing the cross-sectional area of the vanes exposed to the wind, the total force on the vanes can be limited and thus control the maximum rotational speed of the windmill.

The vanes each have a weight 48 attached to the inward edge of the vane. The amount of weight is chosen such that the centrifugal force acting on the weight at the critical speed causes a moment force about the sleeve 42 (FIG. 3) sufficient enough overcome the gravity force of the followers 52 (FIG. 3) in the cam paths 54 and the wind force on the larger outward portion of the vane. The orientation of the vane (or rotation of the vane) will be controlled by the forces acting on the vane and the distance from that force to the center of rotation (i.e., the vane sleeve 42). The centrifugal force (acting on the weight) will act through the center of the weight at a distance that is the width of the shorter trailing portion of the vane. The net resultant force of the wind on the vane will act on roughly the center of the area of the vane that is exposed to the wind, or some amount less than half the width of the leading vane portion depending on the size, shape and configuration of the vane. One skilled in the art would recognize from this configuration that as the speed of the vanes increases, the centrifugal force will continue to increase relative to the wind force.

At very slow wind speeds, the vanes will be fully open or nearly full open on both the upwind and downwind swings because of the strong action of the gravitational force relative to the wind and centrifugal forces. As the force of wind increases on the vanes 14, the vanes will act like sails and drive the windmill to spin faster in the design spin direction, namely counterclockwise in the figures. As the centrifugal force builds relative to the gravitational restoring force, the vanes may begin to partially close on the upwind side. Furthermore, the vanes may begin reopen more slowly on the downwind side. As the windmill spins faster still, a critical speed is reached where the centrifugal force begins to exceed the gravitational restoring force. Once this happens, the vanes reach a fully closed position on the upwind side because of the combined action of the wind and centrifugal force. As the vanes pass through from the upwind side to the downwind side, the wind force attempts to push the vanes back open. However, the force of the wind on the vanes will be counter-balanced by the centrifugal force acting outwardly on the weights 48 as the speed of the windmill increases. The moment cause by the centrifugal force acting on the weighted inward edge counteracts any wind disturbance trying to push the vane back open. Therefore, once the critical speed is reached the vanes close on the upwind side because of the wind and stay closed on the downwind side because of the centrifugal force. Once vanes close, they also act as windshields to all vanes downwind of them, reducing the magnitude of any wind disturbance on the following vanes.

Inertia will keep the vanes spinning at a high speed even as the vanes begin to close and stay closed preventing the wind forces to act on the vanes. Eventually, however, the speed will begin to taper off and the vanes will begin to open as the centrifugal force lessens and gravity forces the followers 52 (FIG. 3) to follow along the cam paths 54 to rotate the vanes into a deployed position. If the winds are sustained, the whole process may repeat itself with the vanes closing again under centrifugal force. One skilled in the art will recognize that the sequence of the vanes closing and opening may occur in a different order depending on the configuration of the vanes, and the degree of escalation of wind, etc. The order of vanes opening and closing as described herein is provided for illustration only.

FIG. 7 shows an alternative form of the invention. In the figure, a windmill 110 has a frustoconical shape, namely top support 122 has a smaller radius than the bottom support 123 so that the vanes 114 form a part of a cone. The rotation of the support structure will carve out and define a frustoconical curve instead of the cylindrical curve of the windmill of FIG. 1A. Additionally, the vanes 114 of this embodiment preferably overlap each other when in the retracted position. This allows for a greater relative surface area of vane to be exposed to the wind by having a larger leading section of the vane than if the vanes were shaped so that they could not overlap. However, in a preferred embodiment, the vanes may also be shaped so that there is no overlap in the closed position for cleaner operation of the vanes.

Figure 8:
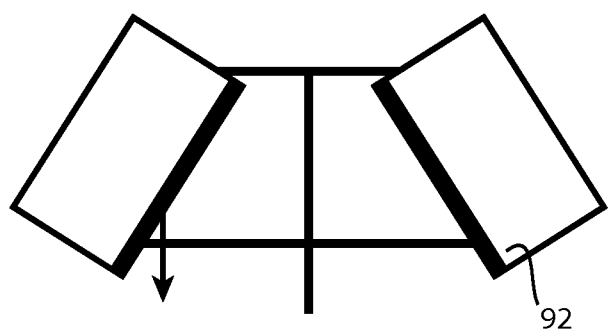
FIG. 8 is a diagrammatic view of an embodiment of the windmill with tilting vanes.

In an alternative embodiment, the vanes could also tilt instead of using an eccentric cam as shown in FIG. 8. By using a weighted edged 92 on a tilting vane, when the vanes are deployed (FIG. 8), the vanes are balanced and "neutral." When the vanes are retracted the vanes are tilted inward so that the weight of the vanes is raised relatively higher than in the deployed position. When the forces are taken off the vanes, the weight causes the vanes to resettle in the deployed position, so that the act similar to that described in the eccentric embodiment.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A windmill rotating in a first direction about a vertical axis comprising:
    a windmill support having a circular upper support plate and a lower support plate and connected by a central drive shaft;
    a base for retaining said windmill support, said central drive shaft received in said base for allowing rotation of said windmill support about said base;
    a plurality of vane supports, each vane support being connected from an outer perimeter of said upper support plate to an outer perimeter of said lower support plate;
    a windmill vane asymmetrically mounted of each of said vane supports, each said vane having a first front portion defined from said vane support to a first outer edge of said vane parallel to said vane support, and having a second rear portion defined from said vane support to a second outer edge of said vane opposite from said first outer edge, wherein during rotation of said windmill in said first direction about said base, said first outer edge of each windmill vane proceeds the second outer edge;
    wherein said windmill vanes are normally biased so that said front vane portion lies inward from said rear vane portion such that wind pressure against said windmill vanes causes said windmill to rotate in said first direction;
    wherein each windmill vane on said vane supports can open and close independently of any other windmill vane mounted on said vane supports.

2. The windmill of claim 1, wherein said upper support plate and said lower support plate having the same radius; and said upper support plate, said lower support plates and said plurality of vane supports form a cylindrical shape.

3. The windmill of claim 1, wherein said upper support plate has a radius larger than said lower support plate; and said upper support plate, said lower support plates and said plurality of vane supports form a frustoconical shape.

4. The windmill of claim 1, wherein said front vane portion weighs more than said rear vane portion.

5. The windmill of claim 1, further having a cam mounted between said windmill vane and said lower support plate for biasing said windmill vane in said in said open position.

6. A method of protecting a windmill rotating in a first direction about a vertical axis comprising:

provinding a windmill support having a circular upper support plate and a circular lower support plate and connected by a central drive shaft;

providing a base for retaining said windmill support, said central drive shaft received in said base for allowing rotation of said windmill support about said base;

providing a plurality of vane supports, each vane support being connected from an outer perimeter of said upper support plate to an outer perimeter of said lower support plate;

providing a windmill vane asymmetrically mounted of each of said vane supports, each said vane having a first front portion defined from said vane support to a first outer edge of said vane parallel to said vane support, and having a second rear portion defined from said vane support to a second outer edge of said vane opposite from said first outer edge, wherein during rotation of said windmill in said first direction about said base, said first outer edge of each windmill vane proceeds the second outer edge;

exposing said windmill to wind pressure, said wind pressure causes said windmill to rotate said windmill in said first direction;

each of said windmill vanes having a concave surface for receiving said wind pressure and causing said vanes to act against said vane support to move said windmill in said first direction;

each of said windmill vanes having a convex portion opposite said concave portion to reduce the counterproductive force of wind on the vane supports from said concave portion;

mounting each said windmill vanes to rotate relative to said upper and lower support plates, such that wind pressure on said concave portion biases said vanes towards a first deployed position independent of the position of any other windmill vane on said windmill and such that wind pressure on said convex portion biases said vanes towards a second, non-deployed position; and having a cam mounted between each of said windmill vanes and said lower support plate for biasing each of said windmill vanes in said first deployed position.

7. The method of protecting a windmill of claim 6 further comprising:

weighting said front portion of each said windmill vane with more weight than said rear portion of each respective windmill vane such that when the wind is at a first, low speed, the vanes, the forces on a first windmill vane bias the first windmill vane towards the deployed position, and when said wind is at a second, high speed, a centrifugal force acting on said front portion of said first windmill vane cause said first windmill vane to retract to the non-deployed position for a portion of one rotation of the windmill in the first direction.

8. The method of protecting a windmill of claim 7, further comprising:

when said wind is at a third, highest speed, a centrifugal force acting on said front portion of said first windmill vane cause said first windmill vane to retract to the non-deployed position for a complete one rotation of the windmill in the first direction.

9. The method of protecting a windmill of claim 7, wherein weighting of each said windmill vane comprises adding a first weight along the outer portion of each said windmill vane, said weight having a higher density than said windmill vane.

10. The method of protecting a windmill of claim 6, wherein said upper support plate and said lower support plate form a cylindrical shape.

11. The method of protecting a windmill of claim 6, wherein said upper support plate has a radius larger than said lower support plate; and said upper support plate, said lower support plates and said plurality of vane supports form a frustoconical shape.

12. The method of protecting a windmill of claim 6, wherein said upper support plate and said lower support plate form a cylindrical shape; and when each of said vanes is in the non-deployed position, the upper support plate, lower support plate and windmill vanes all lie along a cylindrical shape.

13. The method of protecting a windmill of claim 6, wherein said upper support plate has a radius larger than said lower support plate;

said upper support plate, said lower support plates and said plurality of vane supports form a frustoconical shape; and when each of said vanes is in the non-deployed position, the upper support plate, lower support plate and windmill vanes all lie along a frustoconical pattern.

14. A method of protecting a windmill rotating in a first direction about a vertical axis comprising:

providing a cylindrical windmill support formed by a circular upper support plate and a circular lower support plate and a plurality of vane supports being connected between an outer perimeter of said upper support plate and an outer perimeter of said lower support plate;

providing said windmill support with a central drive shaft;

providing a base for retaining said windmill support, said central drive shaft received in said base for allowing rotation of said windmill support about said base;

providing a windmill vane asymmetrically mounted of each of said vane supports, each said vane having a first front portion defined from said vane support to a first outer edge of said vane parallel to said vane support, and having a second rear portion defined from said vane support to a second outer edge of said vane opposite from said first outer edge, wherein during rotation of said windmill in said first direction about said base, said first outer edge of each windmill vane proceeds the second outer edge;

exposing said windmill to wind pressure, said wind pressure causes said windmill to rotate said windmill in said first direction;

each of said windmill vanes having a concave surface for receiving said wind pressure and causing said vanes to act against said vane support to move said windmill in said first direction;

each of said windmill vanes having a convex portion opposite said concave portion to reduce the counterproductive force of wind on the vane supports from said concave portion;

mounting each said windmill vanes to rotate relative to said upper and lower support plates, such that wind pressure on said concave portion biases said vanes towards a first deployed position and such that wind pressure on said convex portion biases said vanes towards a second, non-deployed position;

providing a cam between said windmill vane and said lower support such that rotation of said windmill vane to said second, non-deployed position raises said windmill vane along said cam, whereby when said wind pressure on said concave portion is reduced, gravity causes said windmill vane to move vertically downward along said cam toward said first deployed position.

15. The method of protecting a windmill of claim 14 further comprising:

weighting said front portion of each said windmill vane with more weight than said rear portion of each respective windmill vane such that when the wind is at a first, low speed, the vanes, the forces on a first windmill vane bias the first windmill vane towards the deployed position, and when said wind is at a second, high speed, a centrifugal force acting on said front portion of said first windmill vane cause said first windmill vane to retract to the non-deployed position for a portion of one rotation of the windmill in the first direction.

16. The method of protecting a windmill of claim 14, further comprising:

when said wind is at a third, highest speed, a centrifugal force acting on said front portion of said first windmill vane cause said first windmill vane to retract to the non-deployed position for a complete one rotation of the windmill in the first direction.

17. The method of protecting a windmill of claim 14, wherein when each of said vanes is in the non-deployed position, the upper support plate, lower support plate and windmill vanes form the perimeter of a cylinder.

18. The method of protecting a windmill of claim 14, wherein when each of said vanes is in the non-deployed position, the rear portion of a first vane over lies part of the front portion of an adjacent vane.

19. The method of protecting a windmill of claim 14, wherein each windmill vane can move from said first, deployed position to said second, non-deployed position and back to said first, deployed position independent of any other windmill vane.

* * * * *